United States Patent [19]
Zgoda

[11] Patent Number: 5,823,401
[45] Date of Patent: Oct. 20, 1998

[54] SAMPLING AND DISPENSING BALL-VALVE

[76] Inventor: Roy F. Zgoda, 3601 Four Rod Rd., East Aurora, N.Y. 14052

[21] Appl. No.: 678,342

[22] Filed: Jul. 11, 1996

Related U.S. Application Data

[60] Provisional application No. 60/011,122 Feb. 5, 1996.
[51] Int. Cl.$^6$ ....................................... G01F 11/10
[52] U.S. Cl. ........................ 222/333; 222/368; 222/444
[58] Field of Search .................................. 222/333, 368, 222/444

[56] References Cited

U.S. PATENT DOCUMENTS

| | | | |
|---|---|---|---|
| 4,032,045 | 6/1977 | Epple | 222/368 X |
| 4,058,240 | 11/1977 | Becker | 222/368 |
| 4,383,545 | 5/1983 | Becker | 222/368 X |
| 4,473,092 | 9/1984 | Becker | 222/368 X |
| 5,544,995 | 8/1996 | Ogawa et al. | 222/368 X |

FOREIGN PATENT DOCUMENTS

| | | | |
|---|---|---|---|
| 61-34760 | 5/1994 | Japan | 222/368 |
| 2024158 | 1/1980 | United Kingdom | 222/368 |

*Primary Examiner*—Joseph Kaufman
*Attorney, Agent, or Firm*—Phillips, Lytle, Hitchcock, Blaine & Huber LLP

[57] ABSTRACT

A ball-valve for precise and accurate sampling and dispensing is disclosed. The ball-valve includes a body having a through-bore having a first end and a second end lined with a two-part sleeve which partially surrounds a ball. The ball is rotatably mounted within the sleeve and in sealing engagement with the sleeve. The ball includes a blind-bore of a known volume. The ball rotates between a first position, in which the blind-bore registers with the first end, and a second position, in which the blind-bore registers with the second end. Rotation of the ball transports a known volume from communication with the first end to communication with the second end. The sealing engagement between the ball and sleeve will prevent depressurization through the ball-valve of a vessel mounted to the ball-valve, both when the ball is at rest and when rotating. In addition, the sealing engagement between the ball and sleeve ensures only the desired volume of fluid is transported between the first and second positions.

9 Claims, 4 Drawing Sheets

SAMPLING AND DISPENSING BALL-VALVE

This application claims the benefit of U.S. Provisional Application(s) No(s).: 60/011,122 Feb. 5, 1996.

BACKGROUND OF THE INVENTION

The present invention relates generally to an improved ball-valve, and specifically, to a ball-valve which can precisely and accurately deliver or receive a specific volume.

Ball-valves are commonly use to selectively provide communication between an inlet and an outlet. A ball rotates within a body between two positions. In a first position, the ball-valve presents its convex surface to the inlet, thus preventing communication between the inlet and outlet. The ball is adapted to be rotated to a second position in which a through-bore registers with both the inlet and outlet. Thus, direct communication between inlet and outlet occurs. Traditionally, the inlet of a ball-valve is attached to a pressurized vessel which contains fluid, and the ball-valve is used to transport fluid sequentially from within the pressurized vessel through the inlet, ball-valve and outlet.

However, there are drawbacks to using ball-valves in certain circumstances. These drawbacks are recognized when it is desired to deliver from or receive into a vessel a specific volume. Such need exists when it is necessary to know the condition of a vessel after taking a sample, when it is desired to introduce a predetermined volume into the vessel, or to remove a volume from a pressurized vessel without depressurizing the vessel.

Others have attempted to overcome these drawbacks. However, these attempts do not provide delivery and receipt of exact volumes. For example, U.S. Pat. No. 4,058,240 (AUTOMATIC DRAIN FOR COMPRESSED AIR SYSTEMS) to Becker (hereinafter "Becker") selectively moves compressed fluids from a pressurized system without loss of pressure by using a ball-valve. However, the volume of fluid removed from the pressurized system can not be precisely anticipated. In Becker, the standard through-bore in the ball-valve is replaced with a blind-bore. Accordingly, there is no direct communication between the inlet and outlet sides of the valve when the ball is rotated. However, the sealing rings surrounding the ball do not preclude varying amounts of fluid from traveling with the ball as it rotates.

Becker provides sealing rings (10 and 11) provided around the ball near its top and bottom. As the ball rotates, the leading edge of the blind bore will pass the top seal (10) with its trailing edge remaining above the top seal. Becker does not provide a sealing engagement between the ball and the sleeve, only between the sealing rings, the sleeve and the ball. Accordingly, when the edge of the blind bore is partially above and partially below the top seal, an undetermined amount of fluid may pass through the inlet, into the blind bore, and then between the ball and the surrounding sleeve. Thus, an unpredictable volume exhausts from the pressurized system.

The present invention provides an improved ball-valve adapted to transport a predetermined volume precisely and accurately to overcome the failings of the prior art.

BRIEF SUMMARY OF THE INVENTION

With parenthetical reference to the various drawing figures, the present invention is a ball-valve (10) having a body (11) with a through-bore (12) having first (13) and second ends (14). The through-bore has an inner surface (22) lined with a two-part sleeve (29). The two sleeve parts partially embrace a ball (30) which is rotatably mounted therewithin. The ball includes a blind-bore (33) of a known volume. The sleeve parts sealingly engages at least twenty-five percent of the surface of the ball. The ball is adapted to rotate between a first position where the blind-bore communicates with the first end, and a second position where the blind-bore communicates with the second end. During rotation of the ball, the sealing engagement between the ball and sleeve is maintained to prevent the ball from transporting fluid other than that held by the blind-bore. Therefore, only a predetermined volume is transported from communication with the first end of the valve body to communication with the second end of the valve body.

Accordingly, the general object of the invention is to provide a ball-valve that can precisely and accurately dispense into or sample from a vessel a predetermined volume.

Another object of the invention is to provide a ball-valve that can precisely and accurately dispense into or sample from a vessel a predetermined volume without depressurization of the vessel.

Another object of the invention is to provide a ball-valve that can precisely and accurately dispense into or sample from a vessel a predetermined volume without extra fluid from the vessel being transported by the ball-valve.

Still another object of the invention is to provide a ball-valve that can precisely and accurately dispense into or sample from a vessel a predetermined volume and is adapted to work with standard inlet and outlet fittings.

DETAILED DESCRIPTION OF THE INVENTION

Figure 1:
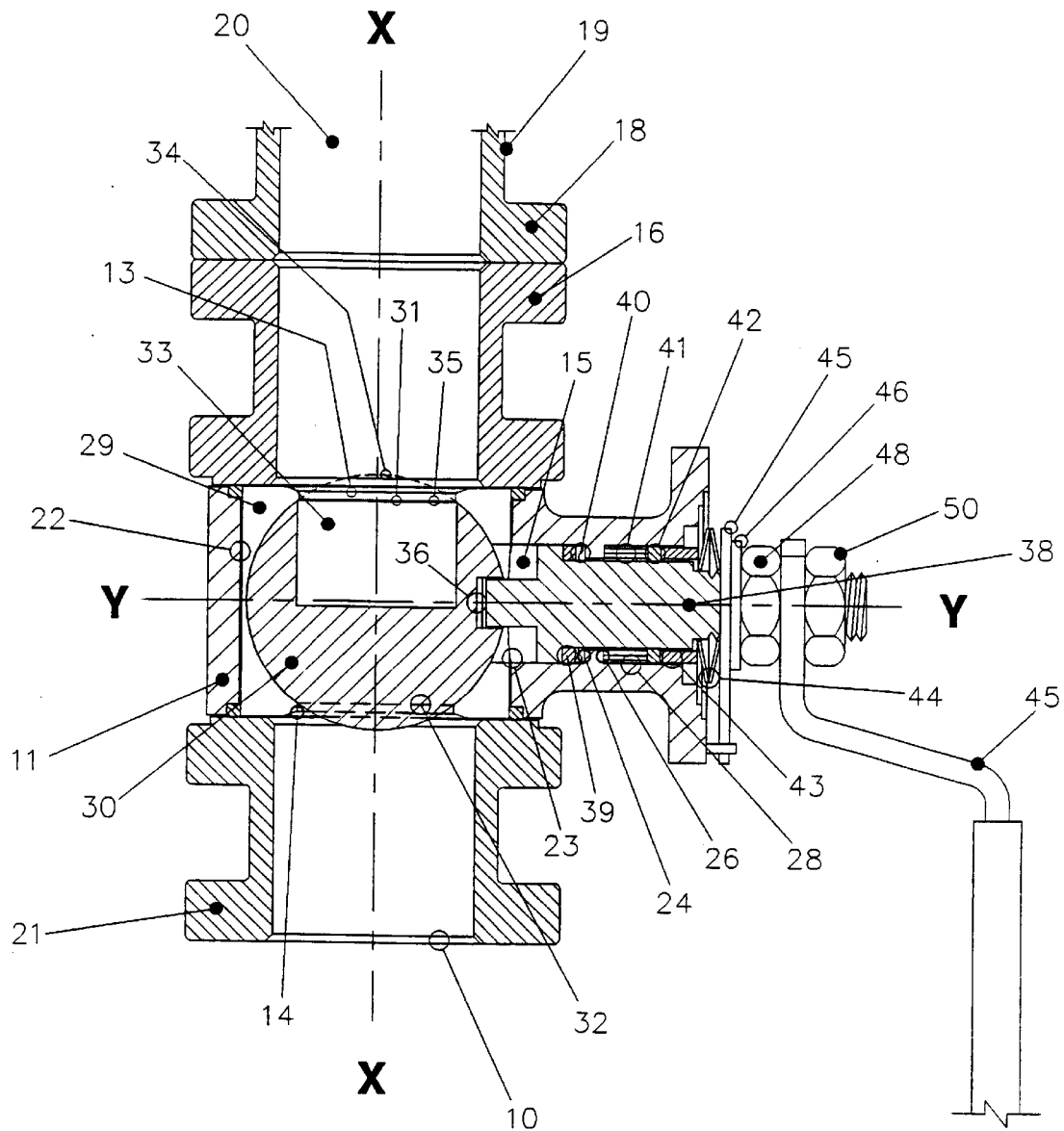
FIG. 1 is a fragmentary section of the invention connected to a pressure vessel.

At the outset, it should be clearly understood that like reference numerals are intended to identify the same structural elements, portions or surfaces consistently throughout the several drawings figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Adverting now to FIG. 1, the ball-valve of the invention 10 is shown has having a valve body 11. Valve body 11 includes a vertical through-bore 12 having a first end 13 and a second end 14 and a horizontal bore 15. First end 13 sealably mounts to standard inlet fitting 16 which in turn sealably mounts to a nozzle connector 18 of a pressure vessel 19 containing a fluid 20. Vessel 19 can be any type of pressurized system such as a batch reactor, flowing process pipeline or process tank. Second end 14 sealably mounts to standard outlet fitting 21.

Through-bore 12 is generated about axis x—x and horizontal bore 15 generated about axis y—y. Through-bore 12 is defined by inwardly-facing cylindrical inner surface 22. Bore 15 is sequentially defined by inwardly-facing cylindrical surface 25, leftwardly-facing vertical surface 24, inwardly-facing cylindrical surface 23, rightwardly-facing vertical surface 26 and inwardly-facing cylindrical surface 28.

A sleeve 29 lines inner surface 22 and is configured to hold a ball 30. Sleeve 29 is preferably a two piece assembly to allow for insertion of ball 30. The opening defined by sleeve 29 includes a cylindrical space having as its upper and lower boundaries first end 13 and a top edge 31, respectively, a truncated spherical volume bounded by top edge 31 and a bottom edge 32, and a cylindrical space having as its upper and lower boundaries bottom edge 32 and second end 14, respectively.

In this embodiment, sleeve 29 is made of reinforced teflon, although any other resilient elastomers could be used such as polyetheretherkeytone sold under the trademark PEEK®, or even non-resilient materials such as specially formulated austenitic alloys and ceramic materials. Ball 30 includes a blind-bore 33. The drilling of blind-bore 33 removes that portion of ball 30 defined by dashed line 34, and forms circular lip 35. Ball 30 is centered within sleeve 29, sealingly engaged with sleeve 29 and able to rotate within sleeve 29. The sealing engagement between ball 30 and sleeve 29 prevents fluid from slipping between ball 30 and sleeve 29, thus, ensuring only the desired volume is transported by ball 30.

The surface of ball 30 also includes a key way 36 adapted to mate with a key 38 which occupies a portion of horizontal bore 15. Key 38 sequentially passes through a washer 39, a thrust washer 40, packing rings 41, a second washer 42, a packing follower 43, two inverted Bellville spring washers 44, two-point contact travel-restricting plate 45, packing nut 46, packing nut lock washer 48, handle 49 and lock nut 50. Packing nut 46 pre-loads packing rings 40.

Figure 6:
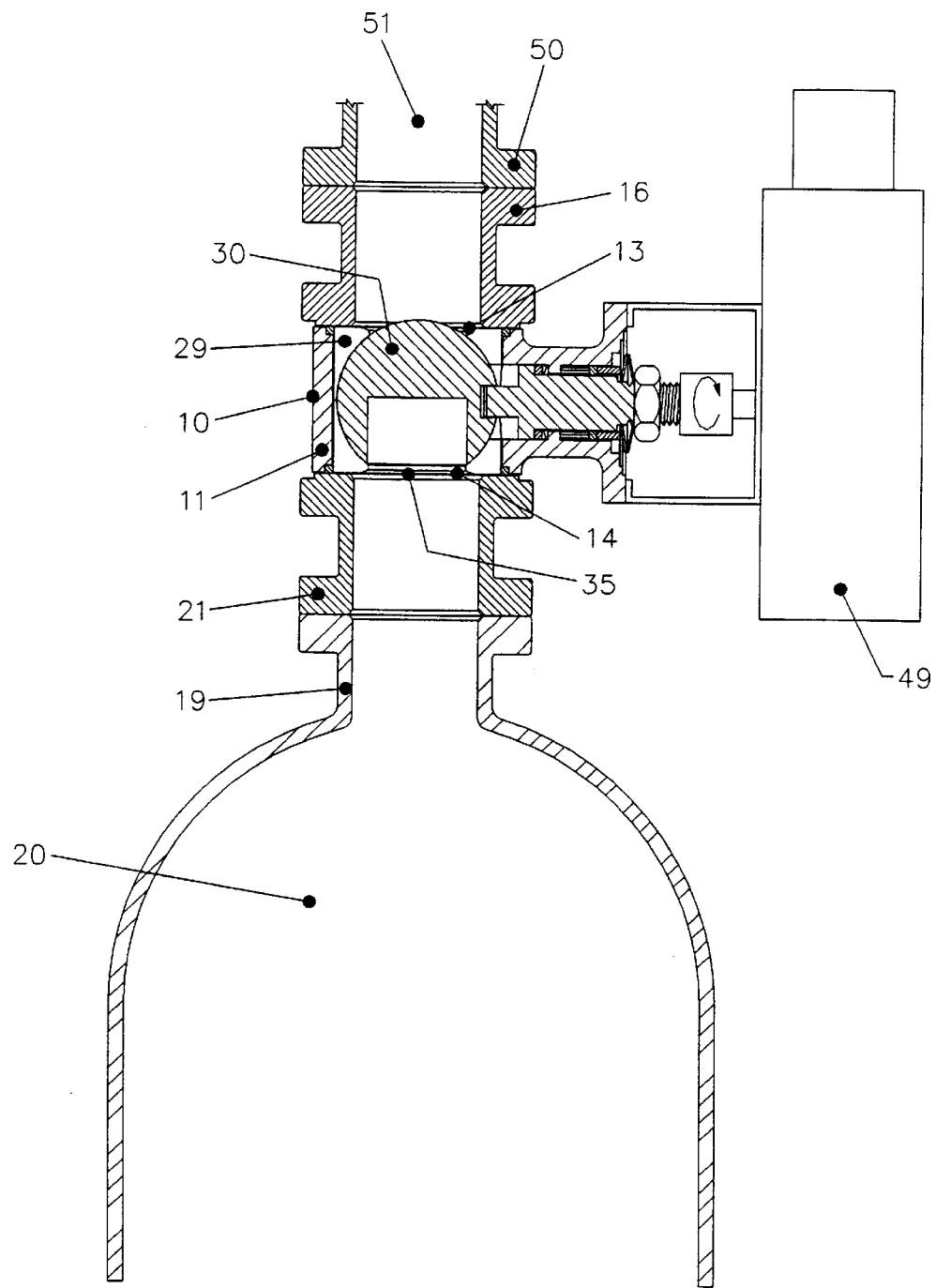
FIG. 6 is fragmentary section of the invention connected to a pressure vessel.

As handle 49 is rotated, key 38 will rotate, forcing a similar rotation of ball 30. A travel stop 51 is mounted to valve body 11 such that travel-restricting plate 45 will contact travel stop 51 to ensure the range of motion for ball 30 is 180°. Handle 49 can be replaced by any commonly available motor 52 as shown in FIG. 6, which can be electro-mechanical or pneumatic.

Figure 2:
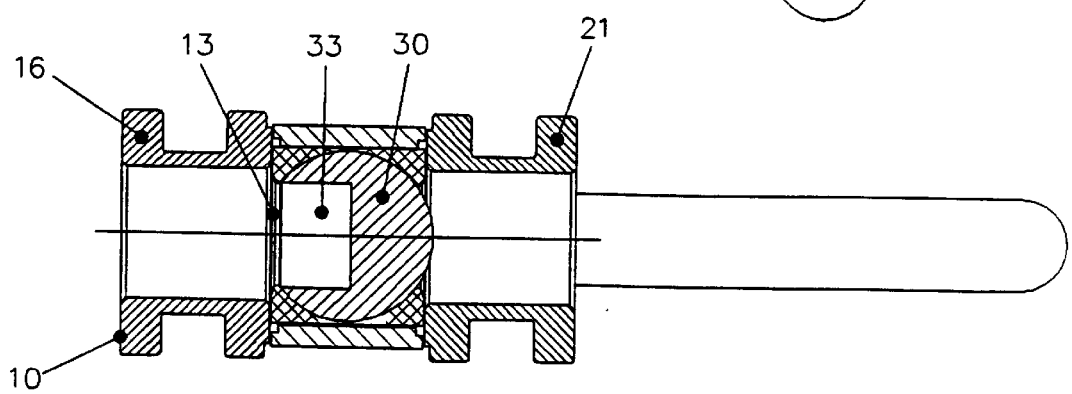
FIG. 2 is a fragmentary section of the invention taken along line axis x—x in FIG. 1.

FIGS. 2–5 show the different positions ball 30 occupies as it rotates. In FIG. 2, ball 30 is positioned such that blind-bore 33 registers with first end 13, inlet fitting 16 and a vessel (not shown). The entire volume of blind-bore 33 and the volume above blind-bore 33 is occupied by fluid. The sealing engagement between ball 30 and sleeve 29 prevents fluid 20 from passing ball 30 into outlet fitting 21.

Figure 3:
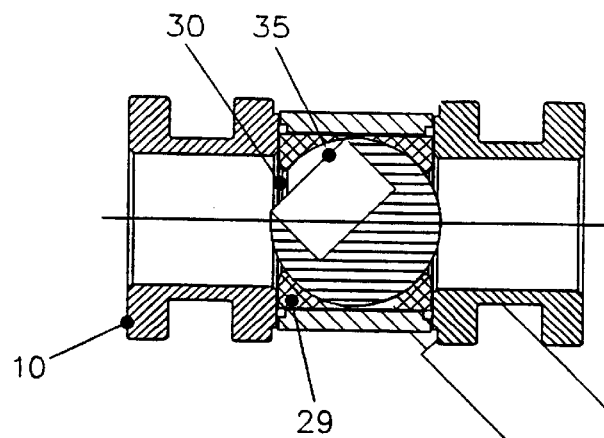
FIG. 3 is similar to FIG. 2, showing the ball partially rotated.

In FIG. 3, ball 30 has been rotated such that lip 35 is partially above and partially below edge 31 of sleeve 29.

Figure 4:
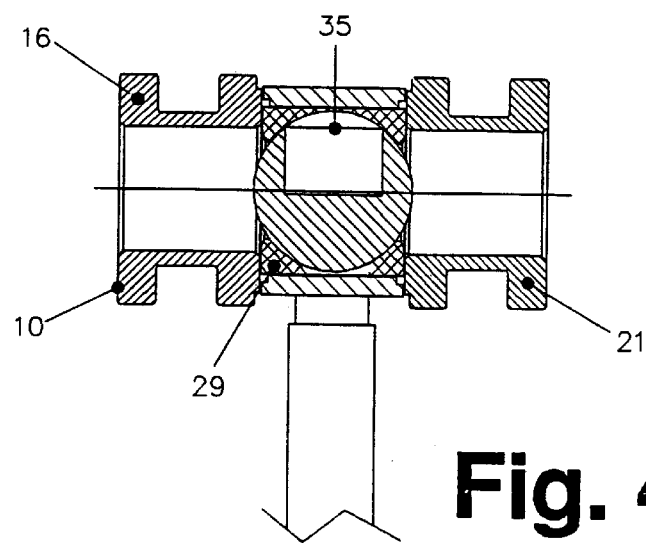
FIG. 4 is similar to FIG. 3, showing the ball rotated further.

In FIG. 4, ball 30 is positioned such that all of lip 35 is below edge 31. The volume of fluid transported by ball 30 is defined by blind-bore 33 and that portion of sleeve 29 registering with blind-bore 33. The cumulative volume is exactly the volume of blind-bore 33 plus that portion of ball 30 defined by dashed line 34 in FIG. 1. The vessel no longer communicates with blind-bore 33 as a continuous surface of ball 30 registers with inlet fitting 16. The sealing engagement between ball 30 and sleeve 29 prevents fluid, other than that fluid held by blind-bore 33, to pass ball 30 into outlet fitting 21.

Figure 5:
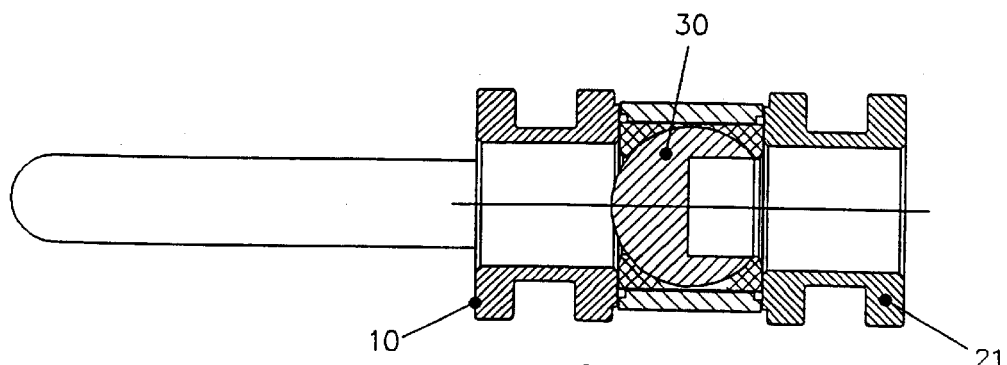
FIG. 5 is similar to FIG. 4, showing the ball fully rotated.

FIG. 5 shows ball 30 in position to exhaust the known volume of fluid transported by ball 30 into outlet fitting 21.

FIGS. 1–5 demonstrate the usefulness of the invention as a sampling device, to remove a set volume from a vessel. The invention can easily be used to dispense a predetermined volume into a vessel.

FIG. 6 shows the invention used as a dispensing valve. Second end 14 of ball valve 10 is sealably mounted to an outlet fitting 21, which in turn is sealably mounted to a vessel 19 holding a fluid 20. An inlet fitting 16 is sealably mounted to first end 13 of valve body 11. Inlet fitting 16 is connected to a second vessel 50 holding a fluid 51 to be introduced in precise and accurate volumes to vessel 19. The process of introducing the dispensed fluid is identical to the method for sampling previously disclosed. The dispensed fluid occupies blind-bore 33 and the volume above blind-bore 33. As ball 30 is rotated, a predetermined volume of fluid is trapped within blind-bore 33 and between lip 35 and sleeve 29. The sealing engagement between ball 30 and sleeve 29 prevents the undesired transfer of fluid between inlet fitting 16 and outlet fitting 19 and vice versa.

Modifications

Although preferred embodiments of the invention have been shown and described, a person of average skill in the art would readily realize changes could be made to the invention as described without modifying the intent of the invention.

I claim:

1. A ball-valve, comprising:

a body having an inner surface and an outer surface, said inner surface extending between a first end and a second end;

a two-piece sleeve arranged within said body, each sleeve part having an inwardly-facing spherically-segmented surface;

a ball rotatably mounted within said sleeve parts, said ball having a blind-bore of a known volume, said spherically-segmented surfaces sealingly engaging at least one-quarter of the surface area of said ball;

said ball adapted to be rotated between a first position, in which said blind-bore communicates with said first end, and a second position, in which said blind-bore communicates with said second end;

said sealing engagement between said spherically-segmented surfaces and said ball being maintained during rotation of said ball between said first and second positions;

whereby rotation of said ball between said first and second positions is adapted to move a predetermined volume from communication with said first end to communication with said second end.

2. The ball-valve as set forth in claim 1 further comprising rotation means to rotate said ball between said first and second positions.

3. The ball-valve as set forth in claim 2 wherein said rotation means is a mechanical rotation means.

4. The ball-valve as set forth in claim 3 wherein said mechanical rotation means includes a slot in said ball adapted to be engaged by a stem, said stem rotated by a lever.

5. The ball-valve as set forth in claim 2 wherein said rotation means is an electro-mechanical rotation means.

6. The ball-valve as set forth in claim 5 wherein said electro-mechanical rotation means includes a slot in said ball adapted to be engaged by a stem, said stem rotated by an electric motor.

7. The ball-valve as set forth in claim 2 wherein said rotation means is a pneumatic motor.

8. The ball-valve as set forth in claim 1 wherein said first end communications with a first vessel containing fluid, and said second end communications with an outlet;

whereby rotation of said ball from said first to said second positions will move a predetermined amount of said fluid from said first vessel to said outlet.

9. The ball-valve as set forth in claim 1 wherein said first end communications with a first vessel containing a first fluid, and said second end communications with a second vessel;

whereby rotation of said ball from said first position to said second position will introduce said predetermined amount of said first fluid into said second vessel.

* * * * *